United States Patent [19]

Economy et al.

[11] Patent Number: 4,965,745

[45] Date of Patent: Oct. 23, 1990

[54] YIQ BASED COLOR CELL TEXTURE

[75] Inventors: Richard Economy; Walter R. Steiner; Richard G. Fadden, Jr., all of Ormond Beach, Fla.

[73] Assignee: General Electric Company, Syracuse, N.Y.

[21] Appl. No.: 135,059

[22] Filed: Dec. 18, 1987

[51] Int. Cl.⁵ .............................................. G06F 15/66
[52] U.S. Cl. .................................... 364/518; 364/521
[58] Field of Search ...................... 364/518, 521, 526; 340/701, 703, 750; 358/81, 133, 146

[56] References Cited

U.S. PATENT DOCUMENTS

| | | | |
|---|---|---|---|
| 4,319,267 | 3/1982 | Mitsuya et al. | 358/75 |
| 4,352,123 | 9/1982 | Flamm | 358/21 R |
| 4,459,677 | 7/1984 | Porter et al. | 340/750 X |
| 4,475,161 | 10/1984 | Stock | 364/521 |
| 4,564,915 | 1/1986 | Evans et al. | 364/521 |
| 4,593,355 | 6/1986 | Chase | 358/133 X |
| 4,595,951 | 6/1986 | Filliman | 358/146 |
| 4,606,625 | 8/1986 | Geshwind | 358/81 X |
| 4,613,948 | 9/1986 | Gharavi | 364/526 |
| 4,725,828 | 2/1988 | Cowlishaw | 340/703 |
| 4,730,223 | 3/1988 | Ikeda et al. | 358/160 X |
| 4,740,832 | 4/1988 | Sprague et al. | 340/703 X |

Primary Examiner—Gary V. Harkcom
Assistant Examiner—Mark K. Zimmerman
Attorney, Agent, or Firm—Paul Checkovich; Stephen A. Young

[57] ABSTRACT

The human eye is more sensitive to brightness than to color. Accordingly, color definition is defined by a luminance or brightness (Y) component, an in-phase component (I) and a quadrature component (Q) and which are appropriately processed before being converted to more traditional red, green and blue (RGB) components for color display control. Scaling and redesignating YIQ data permits representation by fewer bits than a RGB scheme during processing. Also, Y values may be processed at one level of detail while the corresponding I and Q data values may be processed at a lesser level of detail. Translucency information may also be accommodated.

12 Claims, 3 Drawing Sheets

FIG. 4

|  91 | 93 | | | | | | |
|---|---|---|---|---|---|---|---|
| $Y_{11}$ | $Y_{12}$ | | | | | | $Y_{18}$ |
| $Y_{21}$ | $Y_{22}$ | ~97 | | | | | |
| | | | | | | | |
| | | | | | | | |
| | | | | | | | |
| | | | | | | | |
| | | | | | | | |
| $Y_{81}$ | | | | | | | $Y_{88}$ |

95~ marks row 2; 90~ marks row 4.

FIG. 5

| $I_{11}$ | | | $I_{14}$ |
|---|---|---|---|
| | | | |
| | | | |
| $I_{41}$ | | | $I_{44}$ |

94~ marks row 1; 90~ marks row 2.

YIQ BASED COLOR CELL TEXTURE

Background of the Invention

This invention relates to color cell texture for computer image generation (CIG) and, more particularly, to color cell texture for real time CIG systems wherein preliminary processing for obtaining appropriate color information for a display occurs in YIQ color space rather than in the more conventional red, green, blue (RGB), or red, green, blue, translucency (RGBT) color spaces that have been used in other CIG systems.

For example, in a copending application Ser. No. 943,690, now U.S. Pat. No. 4,905,164, filed Dec. 19, 1986, entitled "Color Cell Texture" by Chandler et al, and assigned to the instant assignee, a full color cell texture generator that is useful with CIG systems requires sixteen parallel paths of texture calculation for each of the RGBT components in a high-resolution display channel of the CIG system. Even if the cell map data are compressed prior to performing the parallel computation operations, there still remain sixty-four parallel logic paths per high-resolution channel. Attendant hardware requirements and associated size and cost may make use of that color cell texture scheme infeasible in a CIG system so that only monochrome texture would be available.

The human eye is generally less sensitive to color variation than to brightness variation. It would be desirable to take advantage of the eye's relative sensitivity to brightness and relative insensitivity to color variation for reducing the computational load on, and hardware requirement of, a CIG system that presents color cell texture for images, while still maintaining adequate color rendition of an image so that appropriate color information and training cues may be obtained by an observer.

Typically, a CIG system may be used to train an operator/observer to perform a task, such as piloting an airplane. Although the images displayed do not necessarily have to exhibit realism to the extent that may be expected from camera produced pictures of a scene, they must be sufficiently realistic in order that the trainee will establish conditioned reflexes by reaction to the simulated scene so that identical reactions would be expected to be made in response to a real external environment that is similar to the simulated one.

In accordance with the present invention, one possibility that holds promise as a practical solution to solving the above noted problems is use of a YIQ scheme for color cell texture processing. In a YIQ system, Y represents the luminance, or brightness, and I and Q, which are in-phase and in quadrature, respectively, represent chroma.

Although color television systems have employed MIQ video, wherein M represents the luminance, and I and Q represent the chroma of an image to be displayed, processing is generally performed using analog, or continuous, signals wherein special considerations for scaling and negative signal values do not have to be addressed. In contrast, for computer image generation systems, processing is typically performed in a digital, or discrete, domain wherein accuracy is limited to a predetermined number of bits, and further wherein modification of data may be used for efficiently processing negative valued functions.

Accordingly, it is an object of the present invention to reduce hardware and logic necessary for processing color cell texture information in a computer image generation system.

Another object is to provide apparatus and method for employing YIQ color cell texture processing in a computer image generation system.

Summary of the Invention

In accordance with the present invention, red, green and blue (RGB) source image descriptors are converted to corresponding luminance (brightness), in-phase component and quadrature component (YIQ) format. In one aspect, the RGB data, which may be available from a data base, or cell texture map, is converted to YIQ data that is then stored in another data base, or cell texture map, that is used as the data base for image processing. Conversion from RGB data to YIQ data involves merely a change in the convention for defining color cell texture attributes of an object and thus the transformation may be performed efficiently. Of course, a data base or color cell texture information may be defined directly in YIQ format without need to create or have access to corresponding RGB data.

To achieve further benefits of the present invention, the YIQ data that is expressed in full scale units may be scaled and redesignated (i.e. reassign a positive value to a negative value of I and/or Q) before processing, so that the values of Y, I and Q may be represented by fewer bits, and therefore require fewer parallel bit transmission paths for processing. In addition, since the human eye is less sensitive to color variation than brightness variation, the value of Y representative of brightness may be calculated at normal cell texture resolution, or one level of detail, while the values of I and Q (representative of chroma or color) may be calculated at reduced cell texture resolution or a coarser level of detail, such as one-fourth or one-sixteenth normal cell texture resolution, resulting in an additional saving of hardware.

For a system that processes RGB data, typically 16-bit resolution and corresponding 16 parallel data paths are used for each of the R, G and B components, for a total of 48 paths, while for a system processing scaled and redesignated YIQ data in accordance with the present invention, wherein the I and Q are expressed at one-fourth the Y resolution, 16 parallel data paths are required for Y, but only four parallel data paths are required for each of I and Q. The total of 24 parallel data paths for YIQ processing in accordance with the present invention results in a 2:1 saving over the RGB system. Although some degradation in the color of the object ultimately displayed may be expected over that achieved by RGB processing when YIQ processing is used, the saving in hardware and related expenses when YIQ processing in accordance with the present invention is used may more than compensate for any degradation, especially for systems wherein close color correspondence with the actual object is not considered critical. Further, subjective testing has indicated almost no perceptible difference between traditional RGBT processing and YIQT processing in accordance with the present invention.

After processing, the resulting Y, I and Q values represented in the scaled and redesignated units are rescaled to the original full scale Y, I and Q units, such as with assistance of a table look-up. The full scale Y, I and Q values, which are typically in digital format, may be converted to RGB values. The resulting RGB values may be provided to circuitry for further processing and conditioning before ultimate use by display circuitry.

Translucency data is part of an RGBT data base or color cell texture map. In one embodiment of the present invention, translucency data from an RGBT data base may be processed analogously to the Y data component of the YIQ data derived from the RGBT data base. In another embodiment, YIQ data is processed as hereinbefore described and the value of the Y data, after being rescaled to the original full scale Y units, is used to access a table look-up which provides a signal having a value for translucency in full scale units. This signal for translucency, which is typically in digital format, may be provided to circuitry for further processing and conditioning before ultimate use by display circuitry analogously to luminance Y data.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

Brief Description of the Drawing

FIG. 4 is a schematic diagram of Y data storage for a predetermined area in accordance with the present invention.

FIG. 5 is a schematic diagram of I and/or Q data storage for the same area shown in FIG. 4 in accordance with the present invention.

Detailed Description

In some color texture generature schemes, such as exemplified by U.S. patent application Ser. No. 943,690, filed Dec. 19, 1986, entitled "Color Cell Texture" by Chandler et al, mutually orthogonal red, green and blue (RGB) color axes are used for defining the color space. An additional characteristic designated translucency (T), for indicating the degree of light transmission through an object, and that can vary from none (opaque) to all (transparent), may be processed along with and analogously to the RGB data.

To place the present invention in context and to provide an example of it in an operational environment, the present invention will be described as it may be used in a CIG system, such as exemplified by that of copending U.S. patent application Ser. No. 865,591, filed May 21, 1986, now U.S. Pat. No. 4,727,365 entitled "Advanced Video Object Generator" by Bunker et al and assigned to the instant assignee. In order to accommodate information necessary for cell blending and cell smoothing, such as shown by the Bunker et al application, full color cell texture uses sixteen parallel paths of texture calculation for each of the four RGBT components in a high resolution channel of a CIG system.

Figure 1:
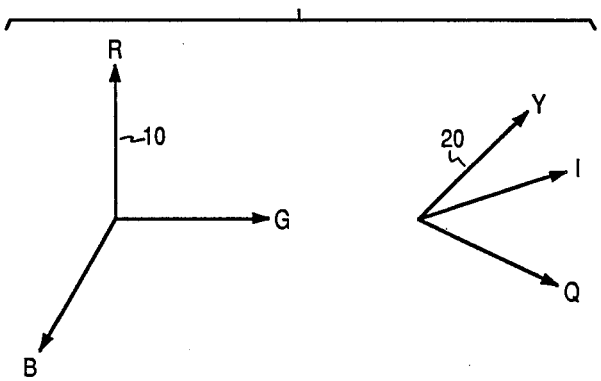
FIG. 1 shows a conventional RGB coordinate system and a corresponding YIQ system in accordance with the present invention.

Referring to the Drawing, wherein like numerals represent like components throughout, and especially to FIG. 1, the relation between an RGB orthogonal system and a YIQ orthogonal system in accordance with the present invention is shown. As used herein, the Y component represents the brightness (luminance) and the I and Q components represent the chroma of a color signal. The I and Q portions may also be designated as the in-phase and quadrature components, respectively. As explained hereinafter in detail, benefits of the present invention may be obtained when the Y component is expressed at the same pixel resolution that would be used for processing in a corresponding RGB system, while the I and Q components are each expressed at a lower pixel resolution.

As illustrated, the RGB system 10 may be represented by three mutually orthogonal axes designated R, G and B, respectively. Each axis of the three orthogonal axis system 10 represents a monotonically changing color intensity of the corresponding RGB color from the origin of the system. Colors that are not a pure rendition of one of the axial colors are assigned a position in the three axis system representative of a combination of intensities of each of the red, green and blue primary colors. Typically, each axis is divided into 256, i.e. $2^8$, discrete intensities, with the origin (0,0,0) designating black and point (255, 255, 255) designating white.

Likewise, the YIQ system 20 may be represented by three mutually orthogonal axes designated Y, I and Q, respectively. The Y axis represents a monotonically changing brightness or luminance characteristic and the I and Q axes represent respective monotonically changing chroma information. One way for determining the orientation YIQ system, especially from an existing RGB system that may have been used to define a data base, is to assign the Y axis to lie coincident with the vector from the origin (0, 0, 0) of the RGB system to point (255, 255, 255), or to any other point having equal R, G and B coordinates, of the RGB system, while maintaining the orthogonality and relative positioning of the Y, I and Q axes. When such a transformation is performed, the coordinates from a point in the RGB system may be mapped to a corresponding point the YIQ system according to the following equations:

| | |
|---|---|
| $Y = 0.299R + 0.587G + 0.114B$ | (1) |
| $I = 0.596R - 0.274G - 0.322B$ | (2) |
| $Q = 0.211R - 0.523G + 0.312B,$ | (3) | wherein Y, I and Q represent the coordinates of the point in the YIQ system corresponding to the point having coordinates R, G and B in the RGB system. If the values along each of the axes in the RGB system are in the range of 0 to 255 (i.e. 256 bits), then Y is in the range of 0 to 255, I is in the range of about −151 to +151, and Q is in the range of about −133 to +133. Each point in an RGB data base may be converted to a corresponding point in a YIQ system for creating a YIQ data base. Of course, Y, I and Q coordinates may be assigned directly and stored in a data base, analogously to creation of an RGB data base, without need to determine the corresponding R, G and B coordinates. Further, since both the RGB system and YIQ system represent conventions for defining data points, no extensive computation is required to transform from one system to the other. Although it is possible directly to manipulate the Y, I and Q coordinates obtained from equations (1), (2) and (3), it has been found that it is more convenient to scale the resulting Y, I and Q coordinates and further to convert the I and Q values to positive numbers, if necessary.

Figure 2:
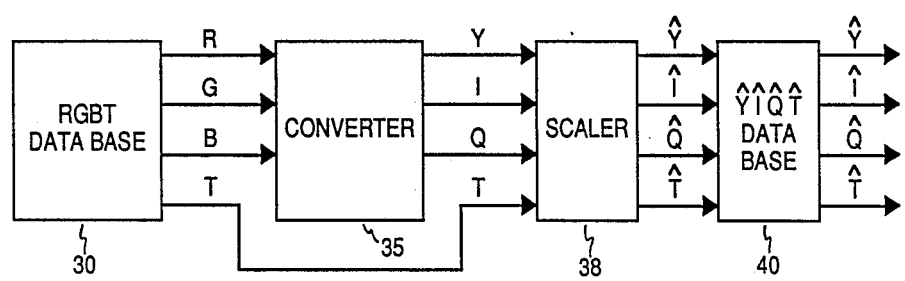
FIG. 2 shows a block diagram of a system for obtaining YIQ data from RGB data in accordance with the present invention.

Referring to FIG. 2, apparatus useful for converting RGB data to YIQ information in accordance with the present invention is shown. An RGBT data base, or cell texture map, 30 includes scene descriptors stored in a bulk storage medium, such as magnetic disc or tape. A system for using an RGBT data base, along with associated controls, is described in the above-identified Chandler et al application. It is to be understood that the system shown throughout the drawing is equally applicable for operation with an RGB data base, wherein translucency related components are not required.

When RGBT data is required from data base 30, such as for determining the characteristics of a pixel to be displayed on a display device (not shown), the R, G and B data point descriptors are made available at a respective output of data base 30 while the associated T data point descriptors are made available at another output of data base 30. RGBT data is requested from data base 30 in response to timing and synchronizing signals (not shown) from the CIG system as is known in the art. Converter circuitry 35, having an input coupled to the output of data base 30 for receiving the R, G and B data, generates in response to the R, G and B data provided thereto corresponding Y, I and Q coordinates in accordance with equations (1), (2) and (3). Resulting Y, I and Q coordinate information available at the output of converter 35 is provided to an input of scaler circuitry 38. Translucency information T, which may be delayed to compensate for internal delays of conversion converter 35, is coupled from another output of data base 30 to another input of scaler circuitry 38, so that the YIQT data received by scaler circuitry 38 corresponds to the RGBT data supplied by data base 30. Scaler circuitry 38 respectively scales the Y, I, Q and T information provided thereto and redesignates the I and/or Q values as positive values if initially negative. The resulting scaled and redesignated values, $\hat{Y}$, $\hat{I}$, $\hat{Q}$ and $\hat{F}$ (or Y', I', Q' and T') are made available at respective outputs of scaler 38. Timing and synchronization signals (not shown) are supplied to data base 30, converter 35 and scaler 38 from a synchronization source (not shown) for coordinating conversion to YIQ data and storage of Y'I'Q'T' data. Converter 35 and scaler 38 may be conveniently implemented as part of a computer program as is known in the art.

In a presently preferred embodiment, converter 35 and scaler 38 are operated off-line for generating scaled Y', I', Q', and T'data available at respective outputs of scaler 38, which are supplied to and stored in Y'I'Q'T' data base, or cell texture map 40. Data base 40, having respective outputs for Y', I', Q', and T' data, may be connected for supplying the Y', I', Q' and T' data to processing circuitry as hereinafter described.

Scaler circuitry 38 determines the maximum and minimum value for each of the Y, I and Q cell texture signals received from converter 35 over the entire cell texture map. Each of the Y', I' and Q' texture cells in Y'I'Q'T' cell texture map 40 is assigned a compressed value, preferably 4-bits, representing a compressed texture cell value. The assigned value for Y', I' and Q' is determined based on the relative location of the respective pre-compressed texture signal between the minimum and maximum value of the corresponding Y, I and Q pre-compressed cell texture values. Using 4 bits for compressing texture cell values, the minimum reassigned value may be represented by 0 and the maximum reassigned value may be represented by 15. By initially sampling the original values over the entire Y, I and Q cell texture values to determine minimum and maximum values and then assigning compressed Y', I' and Q' values, efficient assignment of available compressed values is ensured since the entire available range of compressed values is used.

Although connections between circuit components are represented by a single line throughout, it is to be understood that parallel data transfers may be provided where desired, such as for increasing overall system throughput. In addition, separate connections and circuitry may be used for the each of the respective R, G, B and T, and Y, I, Q and T component data as desired.

Data base 40 supplies Y', I', Q' and T' data at respective outputs thereof, and at the appropriate level of detail, or resolution, in response to signal commands (not shown) relating to the portion of a scene to be displayed that is to be processed. For example, RGBT data may be available wherein each of the R, G, B and T components and each of the Y, I and Q components of the converted YIQ data are represented by 16 bit resolution, whereas each of the corresponding scaled Y', I', Q' and T' data may be represented by four bit resolution.

In addition, RGBT information may be stored at different levels of detail (LOD's), wherein the resolution of an LOD corresponds to a predetermined range interval from a viewpoint into a scene to be displayed. The most detailed LOD for a predetermined area, that is the one having the smallest unit cell, or pixel for object definition and therefore finest resolution, is closest to the view-point with each succeeding coarser LOD having a larger cell and correspondingly less detail and coarser resolution. RGBT information for an object at a predetermined LOD is generally all stored at the predetermined LOD in data base 30. However, for obtaining benefits of the present invention, the Y' data corresponding to the RGBT data may be stored in data base 40 at the LOD of the RGBT data of data base 30, while the associated I' and Q' data are stored in data base 40 at a coarser LOD, typically the next coarser LOD. A detailed explanation of Y, I and Q storage is provided in association with FIGS. 5 and 6 below. Also, a separate data base, (not shown) may be used for storing each of respective Y', I', Q' and T' values where desired.

Figure 3:
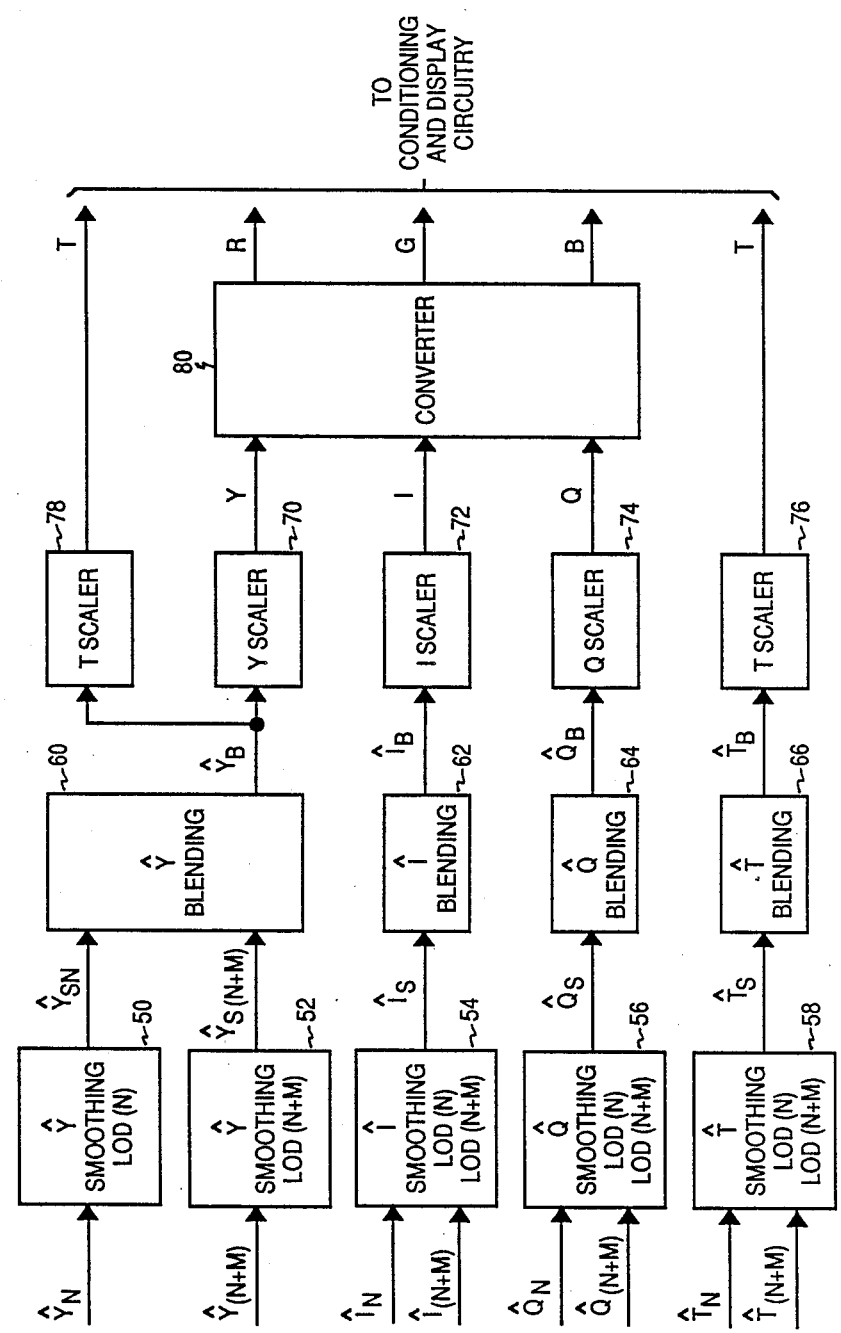
FIG. 3 is a block diagram of a system for processing YIQ data in accordance with the present invention.

Referring to FIG. 3, a system for processing YIQT color information is shown. Detailed explanation of the smoothing and blend operations may be had by reference to the Bunker et al patent. Only so much of the processing will be described here as is necessary to an understanding of the present invention. Scaled values Y' at two different levels of detail (LOD's), or resolution, from data base 40 (FIG. 2) are provided to respective inputs of LOD(N) Y' smoothing circuitry 50 and LOD(N+M) Y' smoothing circuitry 52. Likewise, scaled and/or redesignated values I' and Q', and scaled value T', each at two different LOD's, from data base 40 (FIG. 2) are provided to respective inputs of LOD(N) and LOD(N+M) I' smoothing circuitry 54, LOD(N) and LOD(N+M) Q' smoothing circuitry 56 and LOD(N) and LOD(N+M) T' smoothing circuitry 58, respectively. Only a single smoothing circuit is shown for the I', Q' and T' channel to avoid undue repetition. It is to be understood that circuitry for the I', Q' and T' channels may be arranged analogously to that of the Y' channel. Subscripts N and N+M represent respective levels of detail.

The output of Y' smoothing circuit 50 and Y' smoothing circuit 52, having available smoothed values Y'$_{SN}$ and Y'$_{S(N+M)}$ at LOD(N) and LOD(N+M), respectively, are connected to respective inputs of Y' blending circuitry 60. Blending circuitry 60 proportionately blends the values of the Y'$_{SN}$ signal and the Y'$_{S(N+M)}$ signal. A Y'B signal representative of the blended value of the Y'$_{SN}$ signal and the Y'$_{S(N+M)}$ signal is available at the output of Y' blending circuitry 60. The output of Y' blending circuitry 60 is connected to the input of scaler means 70. Scaler means 70 operates on the blended Y$_B$ signal provided thereto, which is represented in the scaled units, to rescale or convert the Y$_B$ signal value to the same Y signal units that were obtained from equation (1). The output of scaler 70, has the rescaled Y signal available thereat.

In like manner, the output of I' smoothing circuitry 54 is connected to the input of I' blending circuitry 62 and the output of I' blending circuitry 62 is connected to the input of scaler circuitry 72. Similarly, the output of Q' smoothing circuitry 56 is connected to the input of Q' blending circuitry 64 and the output of Q' blending circuitry 64 is connected to the input of scaler circuitry 74. The outputs from scaler circuitry 72 and 74 have the rescaled I and Q signal available thereat. Besides rescaling the value of the I$_B$ and Q$_B$ signals respectively provided thereto, scaler 72 and 74 also assign negative values to the rescaled value when appropoirate.

When a separate translucency signal is processed, the scaled translucency signal T' is provided to the input of T' smoothing circuitry for LOD(N) and LOD(N+M) 58. Processing of translucency data by smoothing circuitry 58, T' blending circuitry 66 and scaler 76 is analogous to that provided by Y' smoothing circuitry 50, Y' smoothing circuitry 52, Y' blending circuitry 60 and scaler 70 for scaled Y' data. The rescaled translucency T signal from the output of scaler 76, is expressed in the same units in digital (i.e. discrete) format as the translucency signal of RGBT data base 30 and is available at the output of scaler 76.

The Y, I and Q signals from scalers 70, 72 and 74 are supplied to converter 80. Converter 80 determines R, G and B values from Y, I, Q information provided thereto in accordance with the following equations, which are derived from equations (1), (2) and (3):

| | |
|---|---|
| R = Y + 0.956I + 0.621Q | (4) |
| G = Y − 0.272I − 0.647Q | (5) |
| B = Y − 1.106I + 1.703Q | (6) |

The resultant RGB data values are provided in the required format at the respective outputs of converter 80 for subsequent processing and conditioning along with an appropriate translucency signal T from scaler 76 or 78, before determining the ultimate display as explained more fully in the Bunker et al and Chandler et al references cited above.

When translucency information is encoded along with the Y signal component T scaler circuit 78 is used and has an input connected to the output of Y' blending circuitry 60 for receiving the Y'$_B$ signal. T scaler circuit 78 provides a rescaled T signal at its output. The translucency channel components, namely T' smoothing circuitry 58, T' blending circuitry 66 and scaler 76 are not required when translucency information is so encoded. Y scaler circuitry 70, I scaler circuitry 72, Q Scaler circuitry 74 and T scaler circuitry 76 and 78 may each include a table look-up having an input for accepting the respective blended signal provided thereto. The respective input signal is used to address the table look-up and in response thereto a respective signal in digital format is obtained.

In one example of the present invention, Y', I', Q' and T' may each be represented by 4 bit compressed data values. Processing through the corresponding smoothing and blending circuitry results in an additional 4 bits of fractional data to be appended to each resulting Y', I', Q' and T' blended signal value that is to be supplied to a respective scaler. The overall resulting 8 bit compressed data value may be used to address a look-up table of corresponding scaler 70, 72, 74, 76 and 78. The output of a look-up table, which constitutes the output of a scaler, is predeterminedly assigned based on the uncompressed Y, I, Q and T data values corresponding to the compressed data value used to address the look-up table.

Referring to FIG. 4, a schematic diagram of Y data storage for a predetermined area 90 and a predetermined LOD in accordance with the present invention is shown. The value stored at each cell or pixel location is represented by a double-subscripted Y, such as Y$_{mn}$, wherein m represents the row and n represents the column. Translucency data T when not encoded into luminance Y data are stored at the same resolution as luminance Y data.

Referring to FIG. 5, a schematic diagram of storage of I data, corresponding to the Y data of FIG. 4, and for the same predetermined area 90, is shown. The value stored at each cell or pixel location is represented by a double-subscripted I, such as I$_{xy}$, wherein x represents the row and y represents the column. A data storage scheme analogous to that illustrated in FIG. 5 may be used for storage of Q data corresponding to the Y data of FIG. 4.

It is noted that one cell 94 of the I (and therefore Q also) data of FIG. 5 covers an area that is four times as large as a single cell 91 of Y data of FIG. 4. In other words, for YIQ data, it may be considered the Y data point is stored at a predetermined LOD and the corresponding I and Q data points are each stored at the next coarser LOD. Thus the data for defining the area represented by the four cells 91, 93, 95 and 97 of Y data (FIG. 5) would be represented by data from cells having the coordinates Y$_{11}$I$_{11}$Q$_{11}$, Y$_{12}$I$_{11}$Q$_{11}$, Y$_{21}$I$_{11}$Q$_{11}$ and Y$_{22}$I$_{11}$Q$_{11}$, respectively. That is, each of the four Y coordinates would be associated with the same pair of I and Q coordinates. I and Q data may be stored at other coarser LOD's for a corresponding luminance Y, if desired.

In one aspect of the present invention, scaler 38 (FIG. 2) accepts Y, I, Q and T data, typically expressed in digital format and each having 16 bit resolution, and makes available scaled data Y , I , Q , and T at respective outputs thereof. The Y, I and Q and T data supplied to scaler 38 are scaled or mapped to a range of 0–15 (i.e. able to be represented by four bit resolution) and the I and/or Q data is redesignated to a positive value if necessary. Translucency data T is scaled using logic similar to that for luminance data Y. Intermediate values (i.e. between minimum and maximum values) of Y, I, Q and T data are mapped to the range of 0–15 with the assumption of uniform spacing (i.e. linear transformation) between the minimum and maximum values.

When 16 bit resolution is used for each of R, G, B and T data, a total of 64 lines are required for parallel processing. By scaling the corresponding Y, I, Q and T data and representing each of the scaled values Y, I, Q and T' with four bit resolution, only 24 lines are required for parallel processing. Additional saving of hardware is possible when translucency T data is not independently processed but is derived from luminance data Y as previously explained in conjunction with FIG. 3.

For complete color definition in scaled units when using the above-described four-bit resolution for each of the Y, I and Q color components, each YIQ cell requires an average of six bits, four for luminance Y data plus one quarter of the total eight bits needed for the I and Q chroma data.

Again referring to FIG. 3, an example of a sample processing operation will be described. The operation is performed for an area of an image to be displayed referred to as a span. One type of span includes eight pixels in a row or line and is eight lines long. A pixel (picture element) is the smallest addressable element of a display device (not shown).

As explained in detail in the Bunker et al application, for each pixel being processed, adjacent cells of the Y' data (4 bits) whose centers define a polygon including the center of the image of the pixel are selected for each of two adjacent LOD's and the selected Y' data are supplied to LOD(N) Y' smoothing circuitry LOD(N) 50 and 40 LOD(M+N) smoothing circuitry 52, respectively. Smoothing circuitry 50 and 52 determine a value 8 bits—4 whole; 4 fractional) for smoothed data $Y_S$ (8 bits —4 whole; 4 fractional) at LOD(N) and LOD(M+N), respectively. Y' blending circuitry 60 accepts smoothed data $Y'_S$ at LOD(N) and LOD(N+M) and proportionately combines the $Y'_S$ data according to a predetermined procedure for determining the blended $Y'_B$ data (8 bits - 4 whole; 4 fractional). Scaler 70 accepts blended $Y'_B$ data and determines Y data (16 bits) in response thereto. The processing of Y' data is performed for each pixel of the span. I and Q' data (4 bits each) are processed analogously to Y' data. However, I data and Q' data are processed for a grid having four equally spaced pixels per row or line, and being four equally spaced lines long. The I' and Q' grids each cover the same area as the Y span. Each region of I' and Q' data processed covers an area of four neighboring pixels used to determine the Y data. Each of the blended values of $Y_B$ data corresponding to one of the four neighboring pixels is associated with the same I' and Q' data as hereinbefore described.

Thus, has been illustrated and described a computer image generation system offering a reduction in hardware and logic necessary for processing color cell texture information. Further, a computer image generation system wherein YIQ color processing may be used has been shown and described.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. In a computer image generation system, a method for generating color characteristics for an object of a scene to be displayed, comprising:
    representing color within the scene by luminance (Y), in-phase (I) chroma and quadrature (O) chroma components;
    processing the Y component at a predetermined first level of detail for determining a resultant Y component;
    processing each of the I and Q components at a predetermined second level of detail for determining a resultant I and Q component, respectively, wherein the second level of detail is coarser than the first level of detail and further wherein the resultant Y, I and Q components are indicative of the color of the object of the scene to be displayed; and
    obtaining translucency (T) data, representative of the object to be displayed, in response to the resultant Y component.

2. The method as in claim 1, further including the step of converting the resultant y, I and Q components to corresponding red (R), green (G) and blue (B) components.

3. The method as in claim 3, wherein the second level of detail is one-fourth the first level of detail.

4. The method as in claim 3, wherein the step of representing includes designating the Y, I and Q components at a first bit resolution and further wherein the method includes the steps of:
    respectively scaling the Y, I and Q components so that the Y, I and Q components are represented at a second bit resolution, the second bit resolution being less than the first bit resolution;
    processing the Y, I and Q components at the second bit resolution for determining the resultant Y, I and Q components at the second bit resolution; and
    rescaling the resultant Y, I and Q components at the second bit resolution to form a resultant Y, I and Q components at the first bit resolution, wherein the resultant Y, I and Q components at the first bit resolution are indicative of the color of the object of the scene to be displayed.

5. In a computer image generating system, a method for generating color characteristics for an object of a scene to be displayed, comprising:
    representing color within the scene by luminance (Y), in-phase (I) chroma and quadrature (Q) chroma components;
    processing the Y component at a predetermined first level of detail for determining a resultant Y component;
    processing each of the I and Q components at a predetermined second level of detail for determining a resultant I and Q component, respectively, wherein the second level of detail is coarser than the first level of detail and further wherein the resultant Y, I and Q components are indicative of the color of the object of the scene to be displayed;
    representing translucency within the scene by a translucency (T) component at a first bit resolution;
    processing the T component at the first level of detail for determining a resultant T component at the first bit resolution; and
    scaling the resultant T component at the first bit resolution to form a resultant T component at a second bit resolution, the first bit resolution being less than the second bit resolution.

6. In a computer image generation system, a method for generating color characteristics for an object of a scene to be displayed, comprising:
    converting red (R), green (G) and blue (B) color information indicative of the object to be displayed to corresponding luminance (Y), in-phase (I) chroma and quadrature (Q) chroma data;

processing the Y, I and Q data for determining resultant Y, I and Q data; and reconverting the resultant Y, I and Q data to corresponding R, G and B information, wherein the corresponding R, G and B information is representative of the color of the object to be displayed; and further wherein the Y, I and Q data are represented at a first bit resolution and further wherein the step of processing includes:

respectively scaling the Y, I and Q data so that the Y, I and Q data are represented at a second bit resolution, the second bit resolution being less than the first bit resolution;

processing the Y, I and Q data at the second bit resolution for determining resultant Y, I and Q data at the second bit resolution;

rescaling the resultant Y, I and Q data at the second bit resolution to resultant Y, I and Q data at the first bit resolution; and obtaining translucency (T) information, representative of the object to be displayed, in response to the resultant Y data at the second bit resolution.

7. The method as in claim 8, wherein the step of processing further includes:
   processing the Y data at a predetermined first level of detail; and
   processing each of the I and Q data at a predetermined second level of detail, wherein the second level of detail is coarser than the first level of detail.

8. The method as in claim 7, wherein the second level of detail is one-fourth the first level of detail.

9. In a computer image generation system, apparatus for generating color characteristics for an object of a scene to be displayed, comprising:
   first scaler means for scaling first color information of the object expressed at a first predetermined bit resolution to provide second color information of the object expressed at a second predetermined bit resolution, wherein the second predetermined bit resolution is less than the first predetermined bit resolution;
   processing means having an input coupled to the first scaler means for receiving the second color information, the processing means for determining third color information of the object expressed at the second bit resolution; and
   second scaler means coupled to the processing means for receiving the third color information, the second scaler means for generating fourth color information of the object expressed at the first bit resolution in response to the third color information, wherein the fourth color information is representative of the color of the object to be displayed.

10. In a computer image generation system, apparatus for generating color characteristics for an object of an scene to be displayed, comprising:
    first scaler means for scaling first color information of the object expressed at a first predetermined bit resolution to provide second color information of the object expressed at a second predetermined bit resolution, wherein the second predetermined bit resolution is less than the first predetermined bit resolution;
    processing means having an input coupled to the first scaler means for receiving the second color information, the processor means for determining third color information of the object expressed at the second bit resolution; and
    scaler means coupled to the processing means for receiving the third color information, the second scaler means for generating fourth color information of the object expressed at the first bit resolution in response to the third color information, wherein the fourth color information is representative of the color of the object to be displayed and further wherein the fourth color information is expressed by luminance (Y), in-phase (I) chroma and quadrature (Q) chroma components and yet further wherein the apparatus includes converter means having an input for receiving the fourth color information, the converter means for determining red (R), green (G) and blue (B) color components corresponding to the fourth color information provided to the converter means,
    wherein the third color information is expressed by luminance (Y), in phase (I) chroma and quadrature (Q) chroma components, and further including third scaler means coupled to the processing means for obtaining translucency (T) information representative of the object to be displayed from the Y component of the third color information.

11. The apparatus as in claim 10, wherein the second color information is expressed by luminance (Y), in-phase (I) and quadrature (Q) chroma components and further wherein the processing means include:
    Y processing means for processing the Y component at a first pixel resolution;
    I processing means for processing the I component at a second pixel resolution; and
    Q processing means for processing the Q component at the second pixel resolution,
    wherein the first pixel resolution is greater than the second pixel resolution.

12. In a computer image generation system, apparatus for generating color characteristics for an object of a scene to be displayed, comprising:
    first scaler means for scaling first color information of the object expressed at a first predetermined bit resolution to provide second color information of the object expressed at a second predetermined bit resolution, wherein the second predetermined bit resolution is less than the first predetermined bit resolution;
    processing means having an input coupled to the first scaler means for receiving the second color information, the processor means for determining third color information of the object expressed at the second bit resolution; and
    scaler means coupled to the processing means for receiving the third color information, the second scaler means for generating fourth color information of the object expressed at the first bit resolution in response to the third color information, wherein the fourth color information is representative of the color of the object to be displayed wherein the first color information is expressed by luminance (Y), in-phase (I) chroma and quadrature (Q) chroma components and further wherein the apparatus includes storage means having an output coupled to the first scaling means for providing the first color information to the first scaling means, the storage means for storing the Y component at a first level of detail and for storing each of the corresponding I and Q components at a second level of detail, wherein the first level of detail is greater than the second level of detail.

* * * * *